(12) United States Patent
Moore et al.

(10) Patent No.: US 9,714,852 B2
(45) Date of Patent: Jul. 25, 2017

(54) GAS FLOW TEST APPARATUS AND METHOD

(71) Applicants: ULC Robotics, Inc., Bay Shore, NY (US); National Grid USA Service Company, Inc., Waltham, MA (US)

(72) Inventors: Ray Moore, Wantaugh, NY (US); Mike McGrade, W. Islip, NY (US); Serafino Catapano, Staten Island, NY (US); Robert Kodadek, III, Long Beach, NY (US); G. Gregory Penza, Old Field, NY (US); Hermann Herrlich, Lindenhurst, NY (US); Griffin Reames, Ypsilanti, MI (US); Joseph M. Vitelli, Jr., Northport, NY (US)

(73) Assignees: ULC Robotics, Inc., Hauppauge, NY (US); National Grid USA Service Co., Inc., Waltham, MA (US)

( * ) Notice: Subject to any disclaimer, the term of this patent is extended or adjusted under 35 U.S.C. 154(b) by 414 days.

(21) Appl. No.: 14/043,460

(22) Filed: Oct. 1, 2013

(65) Prior Publication Data

US 2014/0090481 A1 Apr. 3, 2014

Related U.S. Application Data

(60) Provisional application No. 61/708,290, filed on Oct. 1, 2012.

(51) Int. Cl.
*G01F 1/00* (2006.01)
(52) U.S. Cl.
CPC ..................................... *G01F 1/00* (2013.01)

(58) Field of Classification Search
CPC ..... G01F 1/00; F17D 3/17; F17D 1/02; F15B 11/042; F15B 11/05; Y10T 137/86171
USPC .................................... 73/861; 137/364, 372
See application file for complete search history.

(56) References Cited

U.S. PATENT DOCUMENTS

| | | | | |
|---|---|---|---|---|
| 4,590,790 A * | 5/1986 | Hicks | .................. | G01F 25/0053 73/1.26 |
| 5,320,326 A * | 6/1994 | Ju | .......................... | F16L 37/091 251/149.1 |
| 5,357,809 A * | 10/1994 | Vander Heyden | ........ | G01F 5/00 374/36 |
| 5,778,919 A * | 7/1998 | Petrone | .................. | F16L 55/124 137/15.08 |
| 6,484,740 B2 * | 11/2002 | Guthrie | ................. | E21B 43/006 137/15.03 |

(Continued)

FOREIGN PATENT DOCUMENTS

CN 201181224 Y * 1/2009 ............... G01F 1/34

*Primary Examiner* — Laura Martin
*Assistant Examiner* — Jean Morello
(74) *Attorney, Agent, or Firm* — Brooks Kushman P.C.

(57) ABSTRACT

A gas flow test apparatus and method include a flow monitor that is selectively connectable to a gas pipeline. An air motor driven regenerative blower is used to increase the flow of gas through the around a blockage in the pipeline to simulate an increased gas loading condition on the intake side of the apparatus. The gas drawn from the intake side is not vented to the atmosphere, but rather, is discharged to the exhaust side of the apparatus back into the pipeline. Pipeline pressure is measured on the intake side of the apparatus to ensure that gas supply is adequate for blocking off the pipeline for maintenance.

15 Claims, 3 Drawing Sheets

(56) References Cited

U.S. PATENT DOCUMENTS

| | | | |
|---|---|---|---|
| 2006/0207681 A1* | 9/2006 | Purington | B09B 3/0058 |
| | | | 141/231 |
| 2007/0043976 A1* | 2/2007 | Cunningham | G01F 1/84 |
| | | | 714/27 |
| 2007/0113622 A1* | 5/2007 | Buckley | G01M 3/2823 |
| | | | 73/49 |
| 2010/0065279 A1* | 3/2010 | Conner | E21B 43/121 |
| | | | 166/372 |
| 2010/0236639 A1 | 9/2010 | Penza et al. | |
| 2012/0308420 A1* | 12/2012 | Headley | F01B 17/025 |
| | | | 417/510 |

* cited by examiner

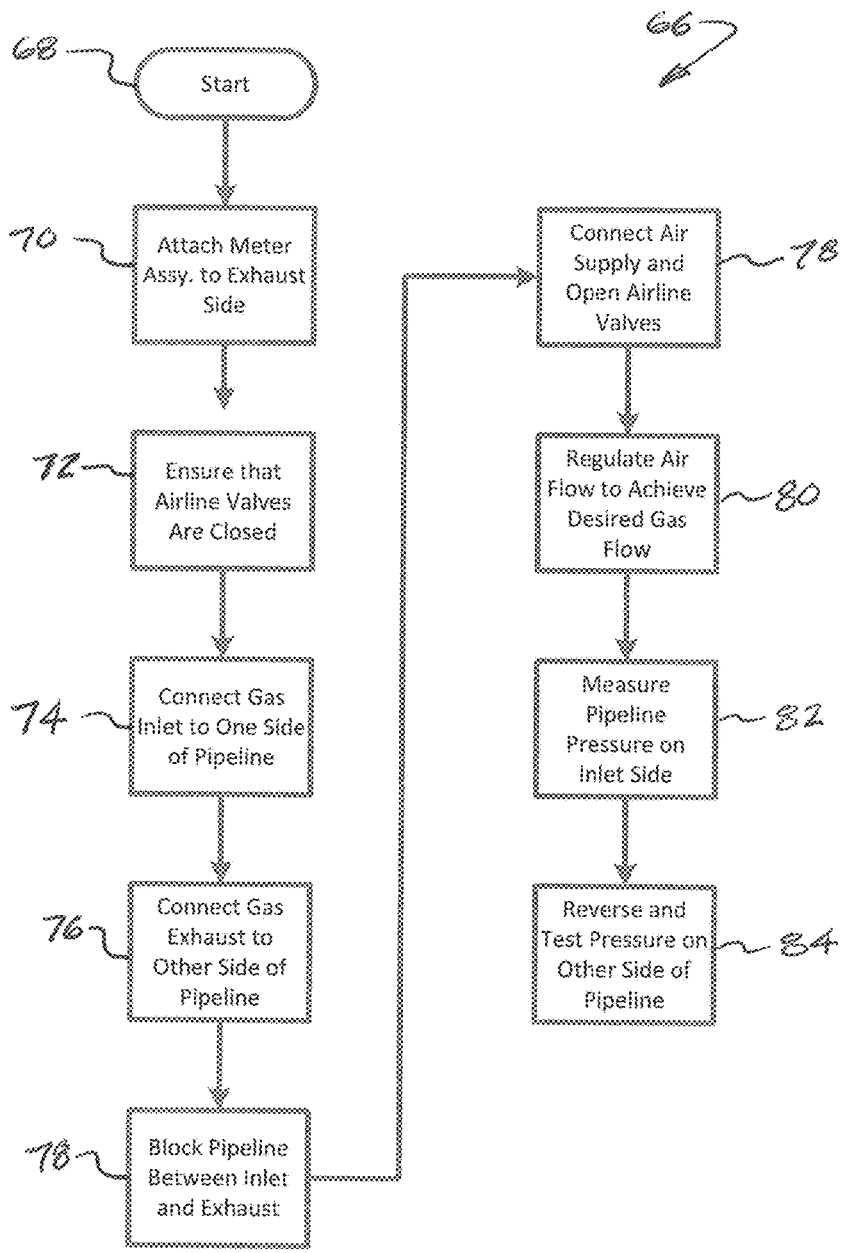

GAS FLOW TEST APPARATUS AND METHOD

CROSS-REFERENCE TO RELATED APPLICATIONS

This application claims the benefit of U.S. provisional application No. 61/708,290 filed 1 Oct. 2012, which is hereby incorporated herein by reference.

TECHNICAL FIELD

The present invention relates to a method and apparatus for testing gas flow in a pipeline.

BACKGROUND

Gas utilities that operate older cast iron systems often find it necessary to perform repair or replacement maintenance on these systems. In the case of low pressure gas mains, which typically operate at approximately 7 inches (in.) of water column—i.e., at about ¼ psig—the work may be performed "live". In such a case, gas flow may be blocked off on both sides of a repair site, while leaving gas supply to other portions of the system in the surrounding area unimpeded.

In order for customers to be unaffected while the work is performed, it is necessary to have adequate gas supply on both sides of the blocked-off work area. To ensure that adequate gas supply is available, a test, sometimes referred to as a flow test, may be performed on both sides of the blocked-off work area before the work begins. A flow test may include installing a bypass around the affected area of the pipeline and then stopping gas flow through the pipeline, thereby forcing the gas to flow through the bypass. A "bypass" is a temporary section of pipe that allows the gas to circumvent the main section of piping during maintenance activities. Gas flow through the pipeline may be stopped, for example, by using a bag stopper. Pressure gauges—e.g., manometers—are installed in the pipeline on either side of the stopper, for example, in the bypass piping, so that the pressure on each side of the affected area can be measured before work begins.

When all of this is installed, a valve in the bypass is shut so that gas flow is effectively stopped on each side of the affected area of the pipeline. At this point, the manometers are measuring the pressure of the gas on each side of the affected area; however, this may not be adequate to determine if customers may be adversely affected by the shutdown. This is because gas usage could increase while the work is being performed, and the gas pressure that was previously considered adequate could drop to an unacceptably low level on one side of the affected area. Therefore, in order to simulate a spike in gas usage, some of the gas from the pipeline on one side of the stopper is vented to the atmosphere generally using a valve connected to the bypass that is open on one side to atmosphere. This venting may continue for 2-3 minutes or more to simulate a realistic gas loading condition. If, during the venting, the measured pressure on the vented side remains above a predetermined level, the gas flow for that side of the affected pipeline area is considered adequate.

Following the venting process, or during an interval during the venting, the venting may be stopped by closing the valve, and manometers may be monitored. To ensure that the side of the main under test has adequate flow to support increased demand, the manometer should, upon closing the valve, quickly return to the nominal operating pressure of the main for example, 7 in. of water column. If the pressure does not return to the nominal level, it may be assumed that there is not sufficient flow from one side of the main to support the increase in demand. This would indicate to the utility that the bypass must stay in place during the repair/maintenance activity. This venting and measurement procedure is repeated on the other side of the stopper to ensure the pressure on that side is also adequate.

Although this method has been shown to be effective, it would be desirable to have an alternative that does not require venting large amounts of natural gas into the atmosphere. Such a system could provide, for example, reduced repair costs, environmental benefits, and a better public perception for the utility. Therefore, a need exists for an apparatus and method that facilitate pressure testing under simulated load conditions similar to those described above, but without requiring large amounts of gas to be released into the atmosphere.

SUMMARY

At least some embodiments of the present invention include an apparatus that impels gas flow from one side of a stopped pipeline to the other side so that the step of venting gas into the atmosphere to simulate a load is eliminated.

At least some embodiments of the present invention include an apparatus that is connectable into a pipeline bypass, and which can simulate a gas loading condition on one side of the pipeline so that pressure measurements can be taken to ensure adequate gas supply on that side of the pipeline.

In at least some embodiments of the present invention, a flow test apparatus includes an air motor driven regenerative blower configured to increase gas flow through a pipeline bypass, thereby simulating a gas loading condition on an intake side of the air motor.

At least some embodiments of the present invention include a method for testing gas flow in a pipeline, including the steps of installing a flow test apparatus in a bypass of a pipeline, or alternatively to fittings on the gas main itself, engaging a regenerative blower in the apparatus to increase gas flow through the bypass, and measuring gas pressure in the pipeline on an intake side of the air motor where the gas loading condition is simulated.

Although the flow test apparatus is effective to simulate a loading condition on a portion of a pipeline prior to maintenance, it may also be used for other purposes. For example, in the case where a bypass is installed in a pipeline as a means to provide a relatively long-term solution to avoiding an obstruction in the main pipeline, embodiments of the present invention may be used to reduce the required diameter of the installed bypass. If, for example, a 4 inch diameter bypass is required in a particular application to ensure adequate gas flow around an obstruction, it may be possible to use a much smaller diameter bypass line if an apparatus in accordance with embodiments of the present invention is used to increase the flow through the bypass.

At least some embodiments of the present invention include a method for characterizing gas flow in a pipeline that includes connecting an inlet of a blower arrangement to the pipeline on one side of a blockage in the pipeline. An outlet of the blower arrangement is connected to the pipeline on an other side of the blockage, and the blower arrangement is operated to impel flow of the gas from the one side of the blockage to the other side of the blockage. A pressure of the gas in the pipeline on the one side of the blockage is measured.

At least some embodiments of the present invention include a method for characterizing gas flow in a pipeline that includes installing a bypass around a blockage in the pipeline. A blower arrangement having an inlet side and an outlet side is connected in-line with the bypass. The blower arrangement is operated to increase a flow of the gas through the bypass and around the blockage, and a pressure of the gas in the pipeline on the inlet side of the blower is measured.

At least some embodiments of the present invention include an apparatus for characterizing gas flow in a pipeline. The apparatus includes a blower arrangement and a meter assembly. The blower arrangement has an inlet and an outlet, and includes a blower and a motor. The motor is connected to the blower and is operable to drive the blower to impel gas flow from one portion of the pipeline connected to the inlet to another portion of the pipeline connected to the outlet. The meter assembly is connectable to and disconnectable from an outlet side of the blower arrangement, and includes a flow meter disposed in relation to the outlet such that it is operable to measure a flow of the gas passing through the outlet.

BRIEF DESCRIPTION OF THE DRAWINGS

FIG. 3 shows a flow chart illustrating a method in accordance with the present invention.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
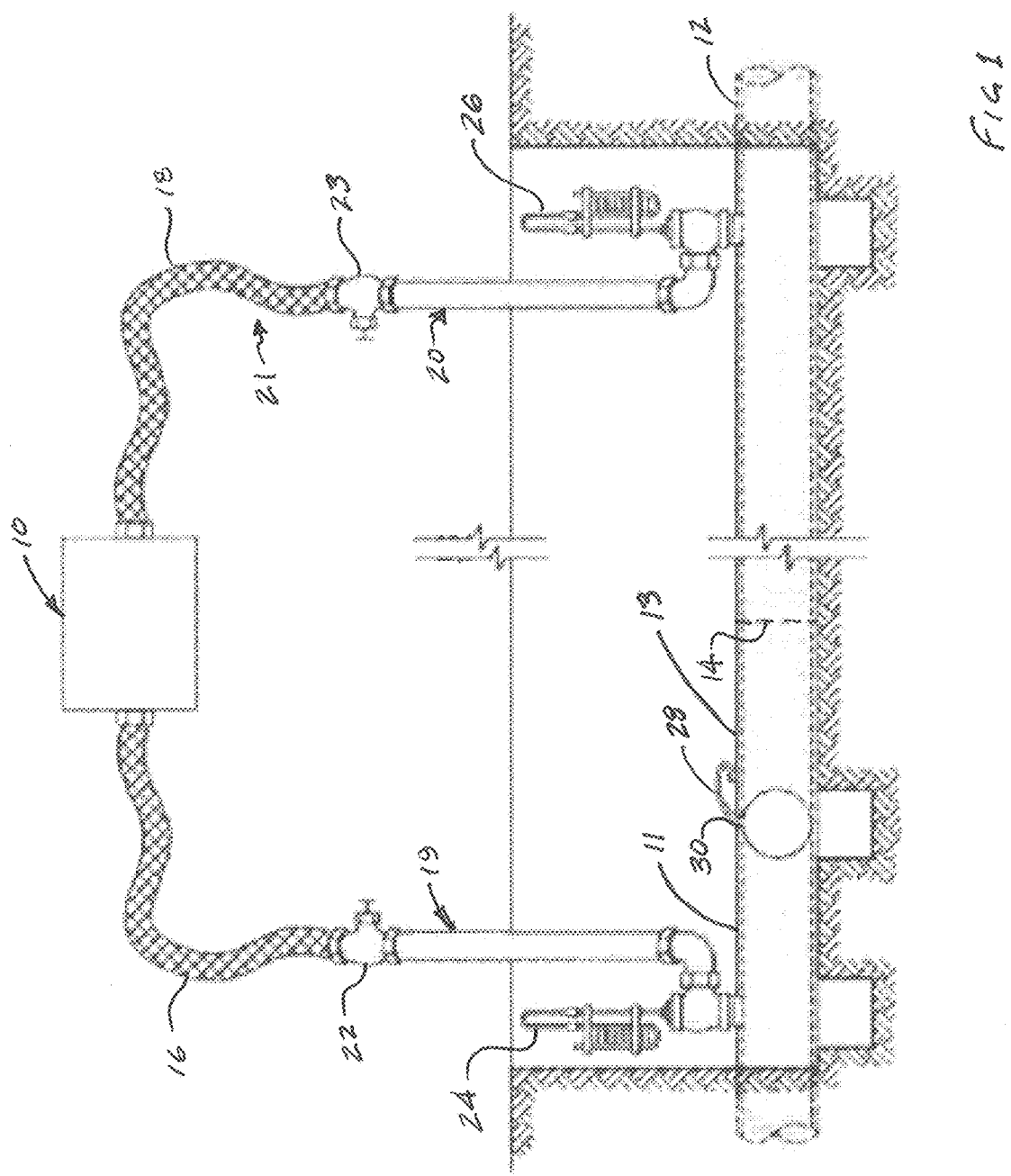
FIG. 1 shows a schematic representation of an apparatus in accordance with embodiments of the present invention installed in a bypass line of a gas pipeline.

FIG. 1 shows a flow test apparatus 10 in accordance with an embodiment of the present invention. As explained in detail below, the flow test apparatus 10 is used in conjunction with repair or preventative maintenance on a low pressure gas pipeline 12. The dashed line 14 shown in FIG. 1 indicates a point of repair, and in particular, a line along which the pipeline 12 may be accessed so that repairs can be effected. The flow test apparatus 10 is connected to the pipeline 12 first through flexible conduits 16, 18, and then through rigid conduits, commonly known as "street tees" 19, 20. The street tees 19, 20 and the flexible conduits 16, 18 make up a bypass 21 that allows gas to flow from one side of the repair site 14 to the other side when the pipeline 12 is stopped-off as explained below. As noted above, the flow test apparatus 10 can be connected to a pipeline, such as the pipeline 12, by any effective means, including connecting it to existing pipeline fittings, or other fittings other than street tees. Therefore, the flow test apparatus 10 bypasses a portion of a pipeline, whether or not there is a bypass line, such as the bypass 21 installed on the pipeline.

Each of the street tees 19, 20 includes a shutoff valve 22, 23, which allows gas through the bypass 21 to be shut off while the test flow apparatus 10 is installed. Pressure gauges, which in this embodiment are manometers 24, 26, are attached to the pipeline 12 and are used to independently measure the pressure on either side of the repair site 14. In order to independently measure the pressure on two different sides of the repair site 14, an inflatable stopper bag 28 is inserted into the pipeline 12 through an opening 30, which may be pre-existing or drilled specifically to insert the stopper 28. The stopper 28 creates a blockage in the pipeline 12 to effectively stop the flow of gas through that portion of the pipeline 12. This means that the pipeline on one side 11 of the blockage 28 may be fed from gas sources different from the pipeline on the other side 13 of the blockage 28. Even if they are fed from the same source or sources, however, the gas will need to travel different routes to reach each side 11, 13 of the stopper 28. This is why, as described in more detail below, it may be desirable to perform a test to characterize the gas flow on both sides 11, 13 of the stopper 28.

Figure 2:
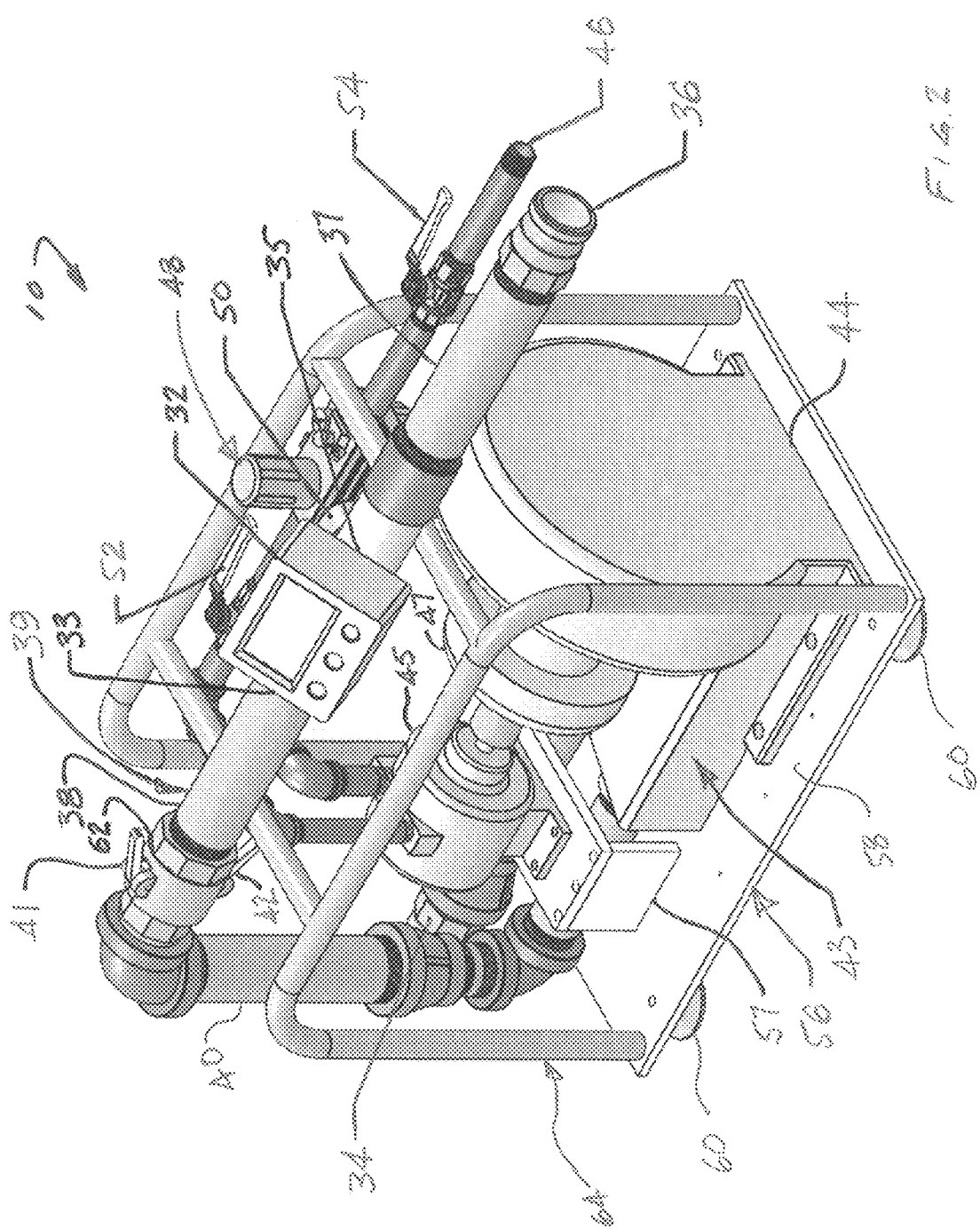
FIG. 2 shows a perspective view of an apparatus in accordance with an embodiment of the present invention.

FIG. 2 shows the flow test apparatus 10 in detail. A volumetric flow meter 32 is used to measure the flow of gas through the bypass 21 during the test procedure. The flow meter 32 as an inlet side 33 and an outlet side 35. A gas intake port 34 is attached to one of the conduits 16, 18, while a gas exhaust port 36 is attached to the other of the conduits 16, 18. In the embodiment shown in FIG. 2, the flow meter 32 is connected to a pair of conduits 37, 38, with the conduit 37 including the exhaust port 36. In at least one embodiment, the conduits 37, 38 and the flow meter 32 form a meter assembly 39, which remains assembled and is quickly attached to a gas exhaust line 40 by quick-disconnects 41, 42. This allows the flow meter 32 to be stored in a protective container separate from other components of the apparatus 10, thereby helping to protect its sensitive measuring instrumentation.

The flow test apparatus 10 also includes a device for increasing the flow of gas through the flow test apparatus 10 and ultimately through the bypass 21. In the embodiment shown in FIG. 2, this is a blower arrangement 43, which includes a regenerative blower 44 driven by a centrifugal air motor 45, and a coupling 47 connecting the output of the motor 45 to the input of the blower 44. The blower arrangement 43 includes an inlet and an outlet, which, in this embodiment, are respectively the intake port 34 and the exhaust port 36. Because the outlet 36 is part of the meter assembly 39, when the meter assembly 39 is not connected to the blower arrangement 43, the outlet is at the location of the quick-disconnects 41, 42, and is generally indicated as outlet 62.

The air motor 45 receives air through an air supply intake 46, which is regulated by an air pressure regulator 48 disposed upstream from the pneumatic motor 45. A pressure gauge 50 indicates the air pressure, thereby allowing an operator to adjust the regulator 48 to achieve the proper airflow to the air motor 45. Valves 52, 54 can also act as regulators or be used to completely prohibit airflow to the air motor 45. The air motor 45 is mounted on a support structure 56, which includes a platform 57, a baseplate 58, mounting feet 60 (only two of which are visible in FIG. 2), and a framework 64, which not only helps to protect the other components of the flow test apparatus 10, but also facilitates easy transport in and around a worksite.

As described above, a flow test apparatus, such as the flow test apparatus 10, can be used to simulate a gas loading condition and check the pressure on both sides of a proposed repair site in a pipeline without venting large quantities of gas to the atmosphere. Using the pipeline 12 and bypass 21 shown in FIG. 1, and the flow test apparatus 10 shown in FIGS. 1 and 2, for an example, at least some embodiments of a method in accordance with the present invention may include the following steps, as indicated in the flow chart 66 shown in FIG. 3. The method starts at step 68 after the bypass 21 is installed without the flow test apparatus 10 connected to it. As described above, the flow test apparatus 10 may be connected directly to the pipeline through conduits or other fittings other than a bypass line such as the bypass 21. Even when it is connected to the bypass 21, however, the flow test apparatus 10 is effectively connected to the pipeline 12.

The flow test apparatus 10 is placed on the ground near the excavation of the pipeline 12, and at step 70 the meter assembly 39 is attached to the gas exhaust side of the flow test apparatus 10 using the quick-disconnects 41, 42. At step 72, the airline valves 52, 54 are maintained or placed in the closed position. At step 74, the gas inlet 34 is connected to the one side 11 of the pipeline 12; in the illustrated embodiment, the inlet 34 is connected to the conduit 16 of the bypass 21. The blower arrangement outlet is connected to the other side 13 of the pipeline 12. Specifically, in the illustrated example, the gas exhaust 36, is connected to the conduit 18 of the bypass 21 at step 76, and the blower arrangement 43 is effectively connected in-line with the bypass 21. At step 78, a blockage is created in the pipeline 12, and in particular, a bag stopper 28 is inflated to force the gas through the bypass 21. It is worth noting that the illustrated and described body's herein generally referred to creating a blockage in the pipeline for purposes of infrastructure maintenance; however, embodiments of the present invention may be used with a pipeline having an existing blockage. In such a case, the goal may be to increase the gas flow from one portion of the pipeline to another around the blockage, and to maintain it on a long-term basis.

At step 78, the air supply intake 46 is connected to an air supply, for example, a motor-driven air compressor. Depending on the size of the air motor used in the flow test apparatus, a minimum air supply pressure of 90 pounds per square inch gauge (psig) may be required. The valve 54 is opened and the air pressure is regulated so that the air pressure gauge 50 reads approximately 70 psig. The valve 52 is slowly opened to engage the air motor 45, which powers the blower 44. The valves 52, 54 can be adjusted to increase or decrease the speed of the air motor 45, and ultimately the output of the blower 44, thereby increasing or decreasing the flow of gas through the bypass 21. The volumetric flow of gas passing through the flow test apparatus 10 is monitored using the flow meter 32 to ensure that it is at a predetermined level. It may also be monitored to ensure that it remains at the predetermined level for a predetermined time. Each of these steps is summarized at step 80 in the flowchart 66.

At step 82, the gas pressure in the pipeline 12 is then measured using the manometer 24. The measurement is taken on this side 11 of the pipeline 12, since, as described above, the intake side of the flow test apparatus 10 is connected to the conduit 16, which is on the left side of the diagram shown in FIG. 1. By measuring the pressure on the inlet side of the blower arrangement 43 while the blower 44 is operating, the gas flow through the pipeline 12 can be characterized—e.g., it can be evaluated to determine whether or not it is sufficient to meet purposes of the end users. As described above, the parameters for this characterization can be determined by, for example, the utility company providing gas service through the pipeline, and may include one or more of the following: the pressure reaching a predetermined minimum, the pressure maintaining at or above the minimum level for a predetermined period of time, or the pressure returning to a level above the predetermined level within some period of time after the blower is shut off.

In some embodiments of the present invention, the flow test apparatus can remain in place and the blower reversed so that the pressure on the other side of the pipeline can be monitored, and thus the gas flow characterized. In the embodiment shown in FIGS. 1 and 2, the flow test apparatus 10 is disconnected from the gas intake 34 and the gas exhaust 36, and the entire apparatus 10 is turned around and reconnected with the opposite orientation. The flow test is then performed again with pressure measurements taken by the manometer 26 to characterize the gas flow on the other side 13 of a blockage 28—see step 84. In either case, the direction of operation of the blower arrangement is reversed. Although the steps illustrated in the flowchart 66 and described herein are presented in a particular order, embodiments of the invention may perform one or more of these steps in a different order, while in some embodiments at least some of the steps may be omitted or others added.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. An apparatus for characterizing gas flow in a pipeline, comprising:
    a first pipeline connection providing access to an interior of the pipeline at the one portion of the pipeline; and
    a second pipeline connection providing access to the interior of the pipeline at another portion of the pipeline separated from the one portion of the pipeline by a blockage in the pipeline,
    a blower arrangement having an inlet connected to the first pipeline connection and an outlet connectable to the second pipeline connection, and including a blower and a motor, the motor being connected to the blower and operable to drive the blower to impel gas flow from the one portion of the pipeline connected to the inlet on one side of the blockage to the another portion of the pipeline connected to the outlet on another side of the blockage; and
    a meter assembly including a flow meter and a pair of conduits, one of the conduits being attached to an outlet side of the flow meter and including the outlet of the blower arrangement, and the other of the conduits having a first end attached an inlet side of the flow meter and a second end selectively connectable to and disconnectable from an outlet side of the blower arrangement to facilitate attachment and detachment of the meter assembly to and from the blower arrangement, the flow meter being operable to measure a flow of the gas passing through the outlet when the meter assembly is attached to the blower arrangement.

2. The apparatus of claim 1, further comprising at least one quick-disconnect for connecting the meter assembly to and disconnecting the meter assembly from the blower arrangement.

3. The apparatus of claim 1, wherein the motor is a pneumatic motor configured to facilitate regulation of an output of the blower through regulation of air being input into the pneumatic motor.

4. The apparatus of claim 3, further comprising a regulator disposed upstream from the motor and configured to regulate airflow to the motor, thereby regulating the output of the blower.

5. The apparatus of claim 1 further comprising a support structure to which at least a portion of the blower arrangement is attached.

6. The apparatus of claim 5, wherein the support structure includes a baseplate on which the blower arrangement is mounted, and a framework at least partially surrounding the blower arrangement.

7. An apparatus for characterizing gas flow in a pipeline, comprising:
   a blower arrangement having an inlet and an outlet, and including a blower and an air motor operable at variable speeds to drive the blower to impel gas flow from one portion of the pipeline connected to the inlet to another portion of the pipeline connected to the outlet and separated from the one portion of the pipeline by a blockage;
   a flow meter operable to measure a flow of the gas passing through the outlet;
   a pneumatic line connected to the motor for conveying supply air to power the air motor; a regulator fluidly attached to the pneumatic line for regulating the flow of the supply air to the air motor; and
   at least one valve disposed in the pneumatic line and operable to at least partially reduce the flow of the supply air through the pneumatic line.

8. The apparatus of claim 7, further comprising a pair of the valves disposed in the pneumatic line, one of the valves being disposed upstream from the regulator, and the other of the valves being disposed downstream of the regulator.

9. The apparatus of claim 7, further comprising at least one conduit attached to the flow meter to form a meter assembly, and at least one quick-disconnect to facilitate rapid connection and removal of the meter assembly to and from the blower arrangement.

10. The apparatus of claim 7, further comprising:
    a first pipeline connection providing access to an interior of the pipeline at the one portion of the pipeline; and
    a second pipeline connection providing access to the interior of the pipeline at the another portion, wherein the one portion of the pipeline is separated from the another portion of the pipeline by a blockage in the pipeline, and
    wherein the blower is operable to impel gas flow from one side of the blockage to another side of the blockage.

11. An apparatus for characterizing gas flow in a pipeline, comprising:
    an intake port connectable to the pipeline for receiving gas from one portion of the pipeline;
    an exhaust port connectable to the pipeline for outputting gas to another portion of the pipeline separated from the one portion of the pipeline by a blockage;
    a regenerative blower in fluid communication with the intake port and the exhaust port, and operable to regulate gas flow from the intake port to the exhaust port;
    an air motor connected to the blower and operable to vary a volumetric throughput through the blower; and
    a flow meter fluidly disposed between the intake port and the exhaust port and operable to measure a flow of gas passing through the exhaust port.

12. The apparatus of claim 11, wherein the air motor is operable at variable speeds to vary the volumetric throughput of the blower.

13. The apparatus of claim 11, further comprising a pneumatic line connected to the air motor for conveying supply air to power the air motor, and a regulator fluidly attached to the pneumatic line for regulating a flow of the supply air.

14. The apparatus of claim 11, further comprising at least one conduit attached to the flow meter to form a meter assembly, and at least one quick-disconnect to facilitate rapid connection and removal of the meter assembly to and from the blower.

15. The apparatus of claim 11, further comprising:
    a first pipeline connection providing access to an interior of the pipeline at the one portion of the pipeline; and
    a second pipeline connection providing access to the interior of the pipeline at the another portion, wherein the one portion of the pipeline is separated from the another portion of the pipeline by a blockage in the pipeline, and
    wherein the blower is operable to impel gas flow from one side of the blockage to another side of the blockage when the intake port is connected to the first pipeline connection and the exhaust port is connected to the second pipeline connection.

* * * * *

UNITED STATES PATENT AND TRADEMARK OFFICE
CERTIFICATE OF CORRECTION

PATENT NO. : 9,714,852 B2  
APPLICATION NO. : 14/043460  
DATED : July 25, 2017  
INVENTOR(S) : Ray Moore et al.

Page 1 of 1

It is certified that error appears in the above-identified patent and that said Letters Patent is hereby corrected as shown below:

In the Claims

Column 6, Line 42:
After "of the pipeline at;"
Delete "the"

After "one portion of the pipeline;"
Delete "and"

Column 6, Line 60:
After "having a first end attached"
Insert -- to --

Signed and Sealed this
Seventeenth Day of October, 2017

Joseph Matal
*Performing the Functions and Duties of the*
*Under Secretary of Commerce for Intellectual Property and*
*Director of the United States Patent and Trademark Office*